(12) United States Patent
Nakvosas

(10) Patent No.: US 11,430,255 B2
(45) Date of Patent: Aug. 30, 2022

(54) FAST AND ROBUST FRICTION RIDGE IMPRESSION MINUTIAE EXTRACTION USING FEED-FORWARD CONVOLUTIONAL NEURAL NETWORK

(71) Applicant: UAB Neurotechnology, Vilnius (LT)

(72) Inventor: Arturas Nakvosas, Vilnius (LT)

(73) Assignee: UAB Neurotechnology, Vilnius (LT)

( * ) Notice: Subject to any disclaimer, the term of this patent is extended or adjusted under 35 U.S.C. 154(b) by 0 days.

(21) Appl. No.: 17/267,499

(22) PCT Filed: Jun. 18, 2019

(86) PCT No.: PCT/IB2019/055084
§ 371 (c)(1),
(2) Date: Feb. 10, 2021

(87) PCT Pub. No.: WO2020/254857
PCT Pub. Date: Dec. 24, 2020

(65) Prior Publication Data
US 2021/0326571 A1 Oct. 21, 2021

(51) Int. Cl.
*G06V 40/13* (2022.01)
*G06N 3/08* (2006.01)
*G06V 40/12* (2022.01)
*G06N 3/04* (2006.01)

(52) U.S. Cl.
CPC .......... *G06V 40/1353* (2022.01); *G06N 3/04* (2013.01); *G06N 3/08* (2013.01)

(58) Field of Classification Search
CPC ......... G06V 40/1353; G06N 3/04; G06N 3/08
See application file for complete search history.

(56) References Cited

U.S. PATENT DOCUMENTS

| 5,572,597 | A | | 11/1996 | Chang |
| 5,825,907 | A | * | 10/1998 | Russo ............... G06V 40/1359 382/125 |
| 5,892,838 | A | | 4/1999 | Brady |
| 7,082,394 | B2 | | 7/2006 | Burges |
| 7,630,521 | B2 | | 12/2009 | Kim |
| 2014/0019390 | A1 | * | 1/2014 | Glennon ............... G10L 25/54 706/46 |

(Continued)

FOREIGN PATENT DOCUMENTS

CN 107480649 A 12/2017

OTHER PUBLICATIONS

International Search Report and Written Opinion dated Dec. 24, 2020 for PCT Application No. PCT/IB2019/055084.

(Continued)

*Primary Examiner* — Stephen G Sherman
(74) *Attorney, Agent, or Firm* — Shannon K. Stauffer

(57) ABSTRACT

Disclosed is a system and method for rapid noise-robust friction ridge impression minutiae extraction from digital signal using fully convolutional feed-forward neural network. The proposed neural network based system outperforms classical approaches and other neural network based systems for minutiae extraction in both speed and accuracy. The minutiae extracted using the system can be used at least for tasks such as biometric identity verification, identification or dactyloscopic analysis.

19 Claims, 4 Drawing Sheets

(56) References Cited

U.S. PATENT DOCUMENTS

2018/0165508 A1* 6/2018 Othman ............. G06V 40/1371

OTHER PUBLICATIONS

Bhavesh Pandya, G. Cosma, A. A. Alani, A. Taherkhani, V. Bharadi, T. McGinnity. Fingerprint classification using a Jeep convolutional neural network. 4th International Conference on Information Management (ICIM), 2018, pp. 86-91.
Kai Cao, D.L Nguyen, C. Tymoszek, A. K. Jain End-to-End Latent Fingerprint Search. Journal of LATEX Class Files, vol. 4, No. 8, 2015.
Branka Stojanovic, A. Neskovic, O. Marques Fingerprint ROI segmentation using fourier coefficients and neural networks. 23rd Telecommunications Forum Telfor (TELFOR)., 2015, pp. 484-487.
Luke Nicholas Darlow, B. Rosman. Fingerprint minutiae extraction using deep learning. 2017 IEEE International Conference on Biometrics (IJCB), 2017, pp. 22-30.
Dinh-Luan Nguyen, K Cao, A. K. Jain, 2018 Robust Minutiae Extractor Integrating Deep Networks and Fingerprint Domain Knowledge. International Conference on Biometrics (ICB), 2018.
Anush Sankaran, P. Pandey, M. Vatsa, R. Singh. On latent fingerprint minutiae extraction using stacked denoising sparse AutoEncoders. IEEE/IAPR International Joint Conference on Biometrics, 2014, pp. 1-7.
John M. Shrein. Fingerprint classification using convolutional neural networks and ridge orientation images. 2017 IEEE Symposium Series on Computational Intelligence (SSCI), 2017, pp. 1-8.
Thomas Pinetz, D. Soukup, R. Huber-Mork, R. Sablatnig. Using a U-Shaped Neural Network for minutiae extraction trained from refined, synthetic fingerprints. Proceedings of the OAGM&ARW Joint Workshop 2017, pp. 146-151.
Yao Tang, F. Gao, J. Feng. Latent fingerprint minutia extraction using fully convolutional network. IEEE International Joint Conference on Biometrics (IJCB), 2017, pp. 117-123.
Yao Tang, F. Gao, J. Feng, Y. Liu. FingerNet: An unified deep network for fingerprint minutiae extraction. IEEE International Joint Conference on Biometrics (IJCB), 2017, pp. 108-116.

* cited by examiner

FAST AND ROBUST FRICTION RIDGE IMPRESSION MINUTIAE EXTRACTION USING FEED-FORWARD CONVOLUTIONAL NEURAL NETWORK

FIELD OF THE INVENTION

The invention relates to a system and method for noise-robust friction ridge impression minutiae extraction from digital signal using fully convolutional feed-forward neural network.

BACKGROUND OF THE INVENTION

Fingerprints are considered to be the most reliable commonly used biometric modality for person identification or verification. The fingerprint (203) itself is an impression left by the friction skin of a finger. Each individual has unique fingerprints 203 each of which is a pattern of ridges and valleys. These ridges and valleys, as seen in FIG. 2, form two most prominent local ridge characteristics: ridge ending (201) and ridge bifurcation (202). Fingerprint minutia extraction is one of two main steps in person identification or verification using fingerprint images, other being fingerprint minutiae matching. Similarly to fingerprints, palms of the hands and soles of the feet and toes have also a friction ridge skin, thus techniques and methods disclosed herein can be applied to more friction ridge impression types.

Fingerprint minutia extraction is an image processing task where fingerprint image is the input of the process and the output of this process is a set of fingerprint minutiae with their specific properties. These properties include minutia class, i.e. ridge ending, ridge bifurcation or none of the above, orientation which represents minutia's direction and also coordinates that represent location of the minutia within original image.

Dealing with real live fingerprint scans poses many obstacles that make fingerprint minutia extraction complicated. Fingerprint images produced using the same scanner may differ significantly due to various factors: a way a subject placed his finger onto a scanner, inconsistent moisture level of the finger, also finger orientation during scanning or variation of area intersection between multiple fingerprint scans, etc. Fingerprints scanned using different fingerprint scanners pose additional challenges like different image resolution, contrast levels, image quality, etc.

Classical fingerprint minutia extraction process may consist of multiple stages of image processing, transformations to get hand-crafted features. Deep neural networks on the other hand promise streamlined, efficient and flexible solution. Many approaches in building fingerprint feature extractor using deep neural networks yield promising results, but all of them are still too complex and lack robustness when compared with applications of deep neural network to more popular image processing tasks.

Building compact deep neural network that is highly efficient and effective in performing specific task is a difficult challenge. It may seem as a straightforward solution to take a neural network that works well for one task and apply it to different one. But often it is not the case. Multiple factors make up the complexity of adjusting neural networks that proved themselves as being superior to other solution. One of such difficulties is that neural networks are hard to analyse. Neural networks in a classical form are built up from layers of weights, biases, convolutions etc. Just to name a few challenges that arise when building neural network based systems: it is often very hard to interpret the weights neural network acquired during testing phase or evaluating capacity of the network to adapt in dealing with given task on a provided dataset in a stable manner. In general, most of the difficulties can be summed up as related to mathematical analysis of data, neural network training methods and the architecture of the network itself.

This invention is describing method for rapid and distortion-robust extraction of fingerprint minutiae from fingerprint image using feed-forward convolutional network structure. Integral part of the invention comprises identifying the neural network structure and properties. There are many existing methods for extracting fingerprint minutiae from fingerprint images. Most of them rely on fingerprint image being of reasonably high quality which is often not the case in real life scenarios, especially when dealing with latent fingerprints. To resolve some of the difficulties raised by blurred or low contrast fingerprint images some extraction algorithms employ Gabor or similar filters to extract fingerprint features but even these algorithms can't reliably extract true fingerprint features in noisy images. Emergence of deep neural networks caused a significant shift in signal processing industry from algorithms extracting handcrafted features to training artificial neural networks to perform this task. Fingerprint image processing is part of this shift.

One example of neural network use for fingerprint minutiae extraction is shown in (Sankaran, 2014). Stacked denoising sparse autoencoders are employed to learn both minutia and non-minutia feature descriptors. These descriptors are later used to build corresponding minutia and non-minutia binary classifiers to classify image patch as containing minutia feature or not containing minutia feature. In order to extract minutia feature map whole fingerprint image is divided in overlapping patches of specified size and every patch is classified by both minutia and non-minutia descriptor based binary classifiers. The final score is obtained by weighted sum fusion of outputs of both binary classifiers. This approach performs inference step for every image patch and returns only approximate position of minutia as a center of classified image patch wherein minutia orientation is not considered. Finally, the training is a twostep process: stacked denoising sparse autoencoders are trained to learn feature descriptors, and neural network model created by removing decoder layers from autoencoder and adding classifier layers, which is finetuned according to the classification task.

Another example of neural network use in minutia extraction from fingerprint images is given in (Yao Tang, 2017). Proposed algorithm comprises two steps: proposal generation with fully convolutional neural network wherein minutia map with corresponding scores is generated from raw fingerprint images and classification of proposed minutiae with convolutional neural network wherein location and orientation of corresponding minutiae are also extracted. These two neural networks share weights of convolutional layers in order to accelerate minutiae extraction speed and the whole process can be divided into the following steps: feature map extraction, proposal generation and region-based classification wherein minutiae properties are extracted. Our approach differs at least in that fingerprint image is processed in a single stage resulting in minutiae feature map extraction without requirement of intermediate proposal generation and region-based classification.

Still another example of neural network use for minutiae extraction from fingerprint images is given in (Yao Tang, 2017). Deep neural network is constructed by replacing classical operations of orientation estimation, segmentation, enhancement and extraction used in traditional fingerprint minutiae extraction pipeline with multi-layer neural network blocks. As a result, segmented orientation field and enhanced fingerprint images are reconstructed from the raw fingerprint image and can be extracted together with minutia map wherein local features including precise location, orientation and confidence are given. This approach differs from our implementation at least in that in our approach fingerprint image is mapped to minutia features without using said intermediate representations which leads to simplified neural network architecture.

Yet in another approach to use neural networks for fingerprint minutiae extraction (Darlow, 2017) pixels are classified in fingerprint image as belonging to minutia class or not. The algorithm is implemented by classifying image patches of specified size with the pixel of interest located in the center with convolutional neural network. The minutia feature map is obtained by sliding window approach over the entire fingerprint image and post processing the result. Finally, minutiae orientations are calculated by using classical method of local orientation estimation. This approach differs from our implementation at least in that former has more complex image processing pipeline: post-processing is performed on the output from neural network and additional classical algorithm is used for minutiae orientation estimation.

Minutia feature extraction from fingerprint image is converted to binary semantic segmentation problem in (Thomas Pinetz, 2017). U-shaped neural network model is used to perform semantic segmentation on raw fingerprint image, consequently each pixel of input image is classified as minutia or non-minutia type. Orientation field is used to calculate orientation of minutiae points afterwards.

Minutiae features are extracted from fingerprint image by using two distinct convolutional neural networks in (Dinh-Luan Nguyen, 2018). The first convolutional neural network named CoarseNet generates minutiae score map together with orientations. Later, second convolutional network named FineNet is used to classify each candidate patch generated by CoarseNet. During second step both minutiae positions and orientations are refined.

In another instance convolutional neural networks were used in latent fingerprint recognition pipeline in (Kai Cao, 2018). Convolutional neural network was used for ridge flow estimation. Also, convolutional neural networks were used for extracting descriptors for each minutia in said fingerprint recognition pipeline. Said approach differs significantly from our approach as fingerprint minutiae are extracted without using neural networks.

In U.S. Pat. No. 5,572,597 neural networks are applied to classify local patterns of features which are extracted from original fingerprint image. These classified local patterns are later used to determine the class of fingerprint image and can also be used in the process of fingerprint identification.

In U.S. Pat. No. 5,825,907 on the other hand neural network is employed to classify coarse direction maps of fingerprints into one of fingerprint classes.

Presented in U.S. Pat. No. 5,892,838 is a system for biometric recognition wherein neural network is used to classify comparison vectors. These comparison vectors represent similarity between master pattern sets of authorized user biometric indicia and a sample pattern set of a user to be authenticated.

In U.S. Pat. No. 7,082,394 distortion discriminant analysis based convolutional neural network is used to extract features of test signal having one or more dimensions, e.g. audio, images or video data. These extracted features are later used for classification, retrieval or identification tasks.

Finally, neural network together with bio signals are used in biometric identification method in US20060215883A1.

CN107480649 discloses a method for extracting sweat pores from fingerprint image. Said method uses fully convolutional neural network to predict preliminary sweat pore locations and then according to characteristics of predicted false sweat pores they are removed from preliminary set to obtain real sweat pore locations using a custom algorithm. Method disclosed herein differs at least in that it uses friction ridge impression minutiae and doesn't require additional candidate feature cleanup.

Proposed approach eliminates necessity for image preprocessing or complex multi-stage neural network architecture for friction ridge impression minutiae extraction. We construct feed-forward convolutional neural network having image input layer and output layer so that no additional processing is required to localize friction ridge impression minutiae and estimate their properties.

SUMMARY OF THE INVENTION

The present disclosure describes a friction ridge impression minutiae extraction system and method. Fingerprints are the most widely used friction ridge impression modality. Fingerprint minutiae extracted from respective images can be later used at least for dactyloscopic analysis, person identification or verification.

Current invention overcomes deficiencies of the prior art fingerprint minutia extraction methods, where the extraction process consists of multiple signal preprocessing stages before feeding it into a neural network or a complex neural network structure that incorporates multiple processing stages which have a significant negative impact onto effectiveness and efficiency of minutia extraction process. Present invention provides a system and method for effective and efficient minutiae extraction from a friction ridge impression digital image using a fully convolutional neural network. Said method includes the following steps: acquiring image using friction ridge impression scanner or loading from pre-scanned image, feeding image into purposefully constructed and trained neural network to obtain encoded features; decoding obtained features to get friction ridge impression minutiae; and storing said fingerprint minutiae into a biometric template. Said training essentially is an end-to-end process because a biometric image produced by an input device is fed into the neural network and the resulting output of the network is a set of fingerprint minutiae.

Proposed fully convolutional neural network outperforms classical approaches and other neural network based systems. Neural network based systems presented in prior art are also more complex and require intermediate feature proposals. System proposed herein on the other hand eliminates proposal generation and subsequent pixel or feature resampling stages and encapsulates all computations in a single network. This makes the proposed neural network easy to train and straightforward to integrate into systems that require fingerprint minutia detection. The architectural simplicity is one of defining characteristics of the proposed neural network based system.

Note that embodiments describe single biometric signal processing method. However, in an alternative embodiment, overall system or a neural network may be constructed to process multiple signals or combination of different biometric signals simultaneously. In yet another embodiment sequence of biometric signals can be processed to incorporate temporal information.

Other applications that can utilize current invention may include: biometric time attendance, national id, voter registration, border control, forensic/criminal, banking systems, healthcare, processing biometric data.

BRIEF DESCRIPTION OF DRAWINGS

The novel features, aspects and advantages of preferred embodiments will be best understood by reference to the following detailed description when read in conjunction with the accompanying drawings and appended claims wherein:

DETAILED DESCRIPTION OF PREFERRED EMBODIMENTS

Figure 1:
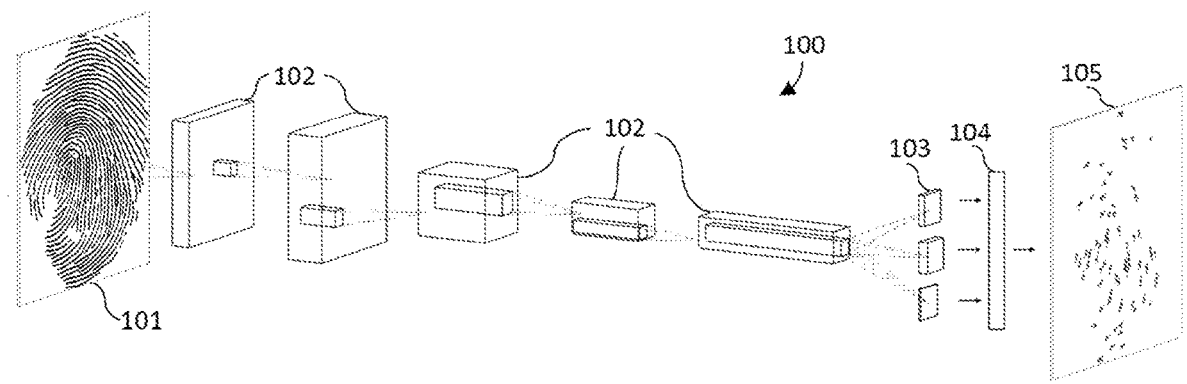
FIG. 1 Simplified diagram of disclosed system showing input image, feed-forward fully convolutional neural network, encoding/decoding step and decoded output feature map.
Figure 2:
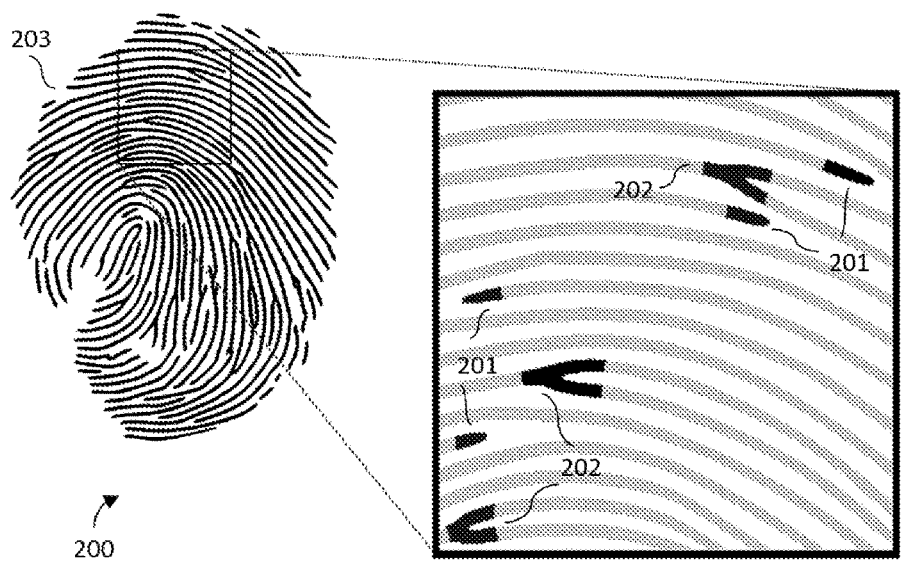
FIG. 2 Illustration of a fingerprint in which minutiae of bifurcation and line ending types are marked within a region of said fingerprint.

Disclosed system (100) for fingerprint minutiae extraction is roughly demonstrated in FIG. 1 is based on neural network. Proposed neural network is a fully convolutional neural network which is built from combination of basic building blocks (102): convolutional layers with nonlinear activation functions. In a preferred embodiment the input to this network is a biometric signal in a form of biometric digital image (101), the output of the neural network is a feature map (103) that can be decoded (104) into biometric minutiae map (105). Neural network input usually is a grayscale friction ridge impression image (101) as is common for many standards in the field. Input values are then passed through a set of convolutional layer blocks (102) which iteratively increase number of output channels or reduces spatial resolution or both. Output of the convolution layer from the last of said blocks (102) is propagated into different convolution branches (103). In a preferred embodiment each feature in the last activation map (103) has a spatial resolution roughly equal to ⅛ of the input resolution. It is possible to construct multiple versions of branching hierarchies or not to split last layers into separate branches at all but in a preferred embodiment each of said branches is responsible for a specific fingerprint feature estimation. Said branching can be supported by having separate components of multi-loss function as will be explained below. These features may be decoded at least as fingerprint minutia orientation, location and class, wherein location compensates for lost precision from reduced special resolution of output features. Decoded feature map may have multiple minutia candidate. One may also see the encoding and decoding as being integral part of the proposed neural network.

Several properties of convolutional neural networks and nonlinear activation function as presented below are very important to fingerprint minutia extraction process. Convolutional layers are hugely important due to their locality, which means that when an image is processed with convolutional layer, local patterns, located nearby in pixel space, are related. Translation invariance is another import property of convolutional layer, which provides neural network the ability to register presence of a specific visual pattern regardless of where in the image that specific pattern appears. In another words convolutional network can learn spatial representations and make decisions based on local spatial input. Data in said convolutional network can be represented as a three-dimensional array of size n×h×w, where h and w are spatial dimensions, and n is a feature or color channel dimension. The input image has dimensions h×w, i.e. height and width, and n color channels. In RGB color image n would be equal to 3 where each channel would often represent red, green and blue color values, in black and white n would be equal to a one—single grayscale intensity channel value. As the raw fingerprint image is fed into a convolutional neural network data goes through multiple convolution layers where each layer performs data transformation. One of the ways to look at said transformation is that value at a specific location in the input image represent pixel color value, but in subsequent layers data is converted into higher abstraction level features. Each feature in a higher layer preserve their path-connection to the original locations in the input image, which is also called: a receptive field of that feature. Formally convolutional layer with activation function $f$ can be characterized by a tensor $W \in \mathbb{R}^{n_o \times n_i \times k_h \times k_w}$, where $n_o$ and $n_i$ are the number of output and input channels respectively, and $k_h$ and $k_w$ are the spatial height and width of the kernel respectively. When the filter is applied to an input patch x with size $n_i \times k_h \times k_w$, we obtain a response vector $y \in \mathbb{R}^{n_o}$ as $$y = f(W * x)$$

where $y_o = f(\Sigma_{n=1}^{n_i} W_{o,i} * x_i)$, $o \in [n_o]$, $i \in [n_i]$, * means convolution operation and $f$ is an elementwise nonlinear activation function. $W_{o,i} = W[o, i, :, :]$ is a tensor slice along the i-th input and o-th output channels, $x_i = x[i, :, :]$ is a tensor slice along the i-th channel of 3D tensor x. And the computational complexity for patch x is $O(n_o \times n_i \times k_h \times k_w)$. It is easy to extend the complexity from patch level to feature map level. Given the feature map size H×W, the complexity is $O(H \times W \times n_o \times n_i \times k_h \times k_w)$.

Furthermore, in a preferred embodiment to improve computational performance for neural network training and inference depthwise separable convolution operation may be used. It is possible to achieve comparable or even better quality by using regular convolution and comparable speed performance using grouped convolutions in combination with 1×1 convolutions. It has to be noted that even more alternative convolution operators may be used to achieve similar or better results, but our experiments shown that optimal performance in a set of hardware and software environments is achieved using depthwise separable convolutions. In fact, depthwise separable convolution provide speed improvement at least over regular convolution that allows targeting applications that are executed on hardware lacking GPU or any other special hardware.

In regular convolution as presented earlier a single convolution kernel deals with n input channels. Depthwise separable convolution on the other hand splits convolution into two parts: a depthwise (DW) convolution and pointwise (PW) convolution. Depthwise convolution focuses on locality by applying n 2D convolution kernels separately for each of n input channels. Thus, convolving over $n_i$ input channels produces a stacked together $n_i$ channel tensor. Pointwise (1×1) convolution on the other hand focuses on relation between channels. To ensure the same shape output as the regular convolution W, DW is defined as the convolution kernel tensor $D \in \mathbb{R}^{n_i \times 1 \times k_h \times k_w}$, and the PW convolution tensor $P \in \mathbb{R}^{n_o \times n_i \times 1 \times 1}$. Applying depthwise convolution to the input patch x and pointwise convolution to the output of depthwise convolution results is the corresponding response vector $y'_o$ as $$y'_o = f_1(\Sigma_{i=1}^{n_i} P_{o,i}(f_0(D_i * x_i)))$$

where $P_{o,i}=P[o, i,:,:]$ and $D_o=D[o,:,:,:]$, $f_0$ and $f_1$ are elementwise nonlinear activation functions. The computational complexity for the whole feature map is $O(H \times W \times (n_i \times k_h \times k_w + n_i \times n_o))$ Alternatively, it possible to switch the convolution order and apply PW convolution before DW to obtain another factorization form PW+DW.

Although many options are available for a nonlinear activation function like Sigmoid or Hyperbolic Tangent, Concatenated ReLU, Leaky ReLU, Maxout, ReLU-6, Parametric ReLU to name a few. The properties that are desirable for a nonlinear activation function are: non-saturation of its gradient, which greatly accelerates the convergence of stochastic gradient descent compared to the likes of sigmoid or hyperbolic tangent functions, reduced likelihood of vanishing gradient, and sparsity-inducing regularization. ReLU, among several other mentioned activation functions, has the properties listed above and is also used in a preferred embodiment as an elementwise nonlinear activation function $f$. $f_0$ and $f_1$ may differ or one of them may be equivalent to $f_i(x)=x$ but in a preferred embodiment $f$, $f_0$ and $f_1$ represent ReLU pointwise activation function, which is defined as follows:

$$f(x) = \begin{cases} 0 & \text{if } x \leq 0 \\ x & \text{if } x > 0 \end{cases}$$

Also, it is important to understand ReLU computational superiority over activation functions like sigmoid or hyperbolic tangent which involve computationally expensive calculations: exponential and arithmetic operations, ReLU on the other hand can be implemented by simply thresholding a matrix of activations at zero.

It is also important to note that distribution of each layer's inputs has significant variation at least due to previous layer parameter change during training. Distribution variation tends to slow down the training process by requiring lower learning rates and careful parameter initialization. To overcome this problem in a preferred embodiment a batch normalization is used. It allows to use higher learning rates and increases neural network tolerance towards initialization parameters. Moreover, batch normalization also acts as a regularization technique which decreases risk of model overfitting. In fact, in a preferred embodiment batch normalization is used after first convolutional layer and in all depthwise separable convolutions after depthwise convolution (DW) and after pointwise convolution (PW). It should be understood that use of batch normalization or alternative regularization means like a dropout layer within neural network architecture is flexible and similar or better results can be achieved be reordering layers in different manner.

When training a neural network it is also important to define the training target. Training problem is defined with respect to the problem class neural network is expected to solve. Training methods may be chosen in multitude of different ways with varying result, but in a preferred embodiment orientation and localization training is defined as regression problem and for determining fingerprint minutia class as classification problem. To evaluate how neural network is performing at a given training step with provided input data and expected output result we define a loss or error function.

Loss function is necessary to measure the inconsistency between predicted value y and actual value ŷ which is generated by the network for a given input sample. The evaluated error from incorrect predictions is then used to iteratively adjust neural network weights or convolutional filter values. The multi-loss function in a preferred embodiment consists of four parts: classification, negative classification, localization regression and orientation regression as follows:

$$L(y,\hat{y},\neg y,\neg \hat{y},l,\hat{l},o,\hat{o}) = m_p * L_{cls}(y,\hat{y}) + m_n * L_{\neg cls}(\neg y,\neg \hat{y}) + m_p * L_{loc}(l,\hat{l}) + m_p * L_{ori}(o,\hat{o}).$$

Here $m_p(\hat{y})$ and $m_n(\hat{y})$ are masking factors calculated from ground truth minutia point confidence value. They are applied to all partial losses so that only minutia point concerned is contributing to the loss. The y, ¬y, l, o in multi-loss function represent the predicted probabilities of fingerprint minutia class candidate presence, absence, localization and orientation respectively. It should be noted that said multi-loss function can have less or more partial loss components that calculate loss over fingerprint feature parameters or meta-parameters.

In a preferred embodiment for positive and negative classification softmax crossentropy sum is used as a partial loss function. For localization and orientation sum of differences between actual and predicted values as a partial loss regression function is used. Said partial loss functions are combined into multi-loss function as defined earlier, which in turn is used to do the overall neural network loss estimation to make iterative weight adjustments. Said weight adjustment is performed by a specific optimizer function. Similarly as with other neural network parameters there are multitude of optimizers to choose from, Adagrad, Adadelta, RMSprop just to name a few, but in a preferred embodiment Adam optimizer is used.

Another aspect of the neural network training process that often has significant impact onto training convergence is a method of initializing neural network connection weights and convolutional filters. The neural network may be initialized in multiple ways. In a preferred embodiment neural network weights and convolutional filter values are initialized at random. In alternative embodiments initial values may be set to zeros or values according to some specific heuristic. In yet another embodiment neural network initial weights or convolutional filter values or both are initialized from previously trained neural network trained for different biometric modality or other visual signal set which is also called transfer learning.

Figure 3:
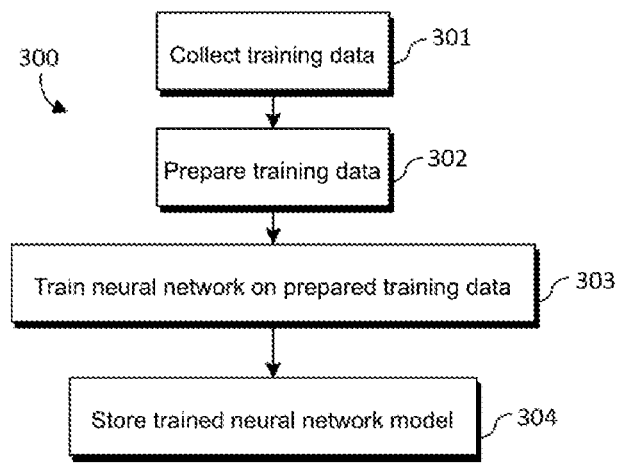
FIG. 3 Flow diagram showing neural network training process.
Figure 4:
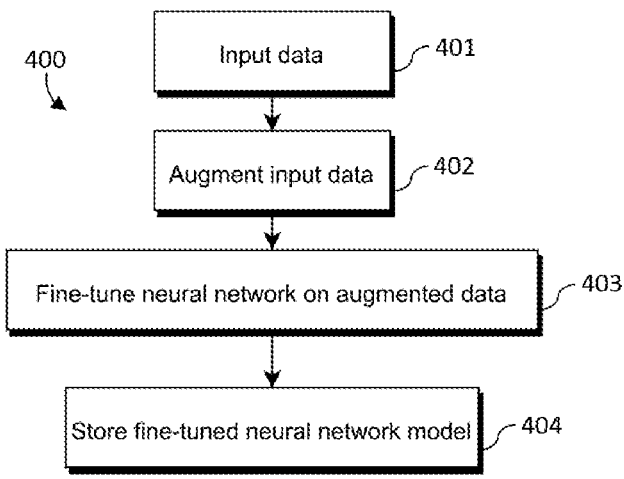
FIG. 4 Flow diagram showing neural network fine-tuning process.
Figure 7:
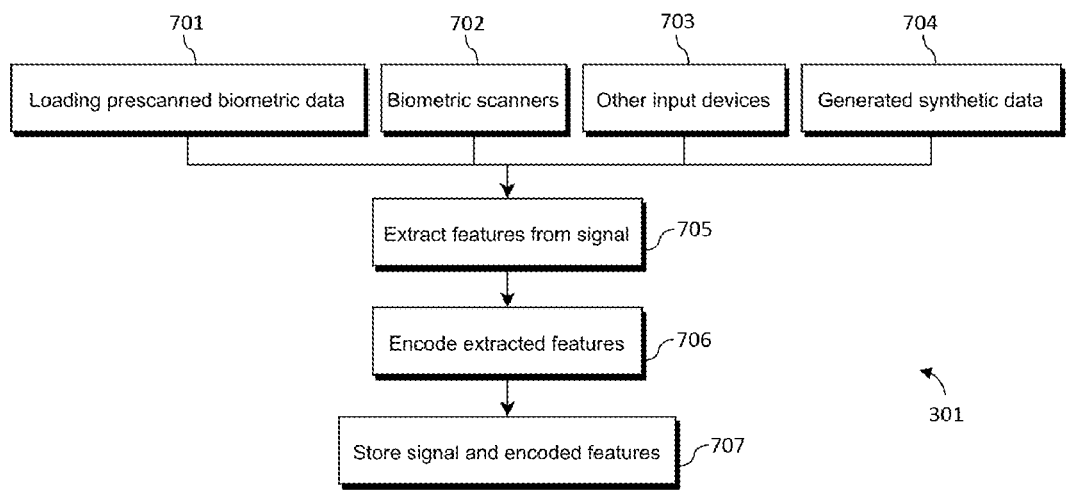
FIG. 7 Flow diagram showing training data collection process.

Another way to describe the neural network training process is to divide it into several steps. A generic exemplary neural network training process (300) is demonstrated in FIG. 3. Here, firstly, training data is collected (301). The next step is modifying (302) collected data if necessary prior to training, which then is followed by step of neural network training on prepared training data (303). The process is finished by storing trained neural network model (304). Process of collecting training data (301) can be further subdivided and is demonstrated in FIG. 7 flow diagram. In an embodiment where biometric signals are fingerprint impression images the collection process starts with acquiring fingerprint images which can be done by loading pre-scanned biometric data (701), by recording fingerprint images with biometric scanners (702) or any other input devices (703). Also, synthetic data generation (704) can be used. In step (705) minutiae with corresponding features are extracted from collected fingerprint images. The minutiae can be extracted manually, using automated methods or a combination of both. In step (706) extracted features are encoded which corresponds to a mapping operation from input signal friction ridge minutiae to neural network output feature map. Neural network output feature map structure is dictated by the neural network output layer properties. As was mentioned above in a preferred embodiment output feature map has spatial resolution approximately ⅛ of the input signal, thus for a 2D input signal of 512×512 resolution each feature in output feature map would roughly correspond to a 8×8 input signal patch. In a preferred embodiment feature map has at least class, location and orientation channel groups. These groups can be stacked together or be separate depending on preferred neural network architecture. The number of channels per group may depend at least on number of minutiae classes, orientation and location precision and additional candidate subdivisions. Each mapped feature value represents likelihood to contain minutiae and having specific class, orientation or location property within a corresponding patch of the input signal. The illustrated process of training data collection (301) finalized with storing fingerprint images and encoded features (707).

Figure 5:
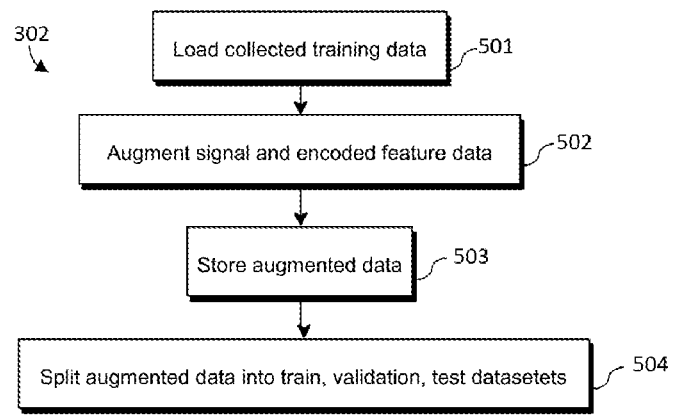
FIG. 5 Flow diagram showing training data preparation process.

FIG. 5 shows a flow diagram of training data preparation (302), which starts by loading collected training data (501). Augmentation of fingerprint images and encoded feature data (502) is used in order to overcome the problem of training data inconsistency during the next step. Said inconsistency is caused by various images which might be present in datasets used for training neural network: images of varying size, proportions and formats, images which include translated, obscured or cropped objects, images containing noise and lacking contrast. In addition to this, data augmentation (502) is used to overcome neural network overfitting to a subset of data which is caused by data variation misrepresentation. In step (503), augmented data is stored. In a preferred embodiment dataset for training neural network is split into train, validation and test subsets in step (504). The train subset is used to build a predictive relationship between the data and neural network inferred minutiae. Validation subset is used to test the network and adjust hyper parameters of the network. Finally, the test subset is used to prevent neural network overfitting either train or validate subsets.

Figure 6:
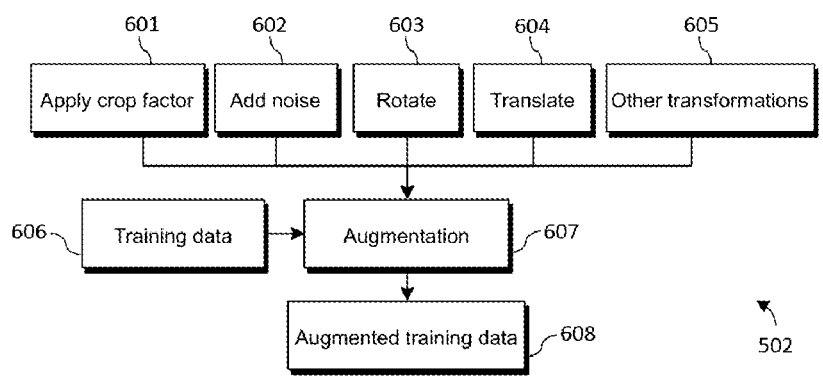
FIG. 6 Flow diagram showing data augmentation process.

Training data augmentation process (502) wherein the dataset is extended by generating new data (608) from existing data (606) using various data transformation techniques (607) is illustrated in FIG. 6. For instance, for neural network to learn to deal with noise variations data augmentation (607) would include generating new images by taking existing image from a dataset and adding noise (602), or applying random crop (601) to simulate partial object occlusion in the image, etc. Data augmentation might comprise steps of rotation (603), translation (604) or other transformations (605) which include padding, flipping and other. Various combinations of augmentation may be used to expand the dataset (606). Where appropriate augmentations (601, 602, 603, 604, 605) are applied (607) to both input signal and extracted feature data so that augmented input signal and extracted features correspond. Extracted and augmented biometric data then needs to be encoded into form corresponding to the output layers of the constructed neural network.

The training itself can be carried out using widely available neural network software frameworks like Caffe, PyTorch, Tensorflow or using other appropriate means. It is expected that during the training process overall quality measure of the network will converge to an optimal value. There is a multitude of strategies for choosing when to stop training and how to choose best trained model from among intermediate trained models but in general said optimal value usually depends on the training data itself so the training process is usually halted as soon as there are indications of trained neural network model overfitting on test or validation data.

Figure 8:
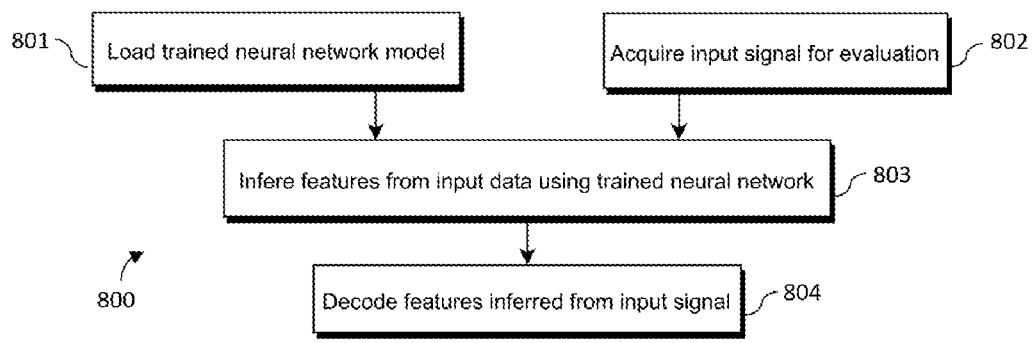
FIG. 8 Flow diagram showing neural network utilization.

After training is completed and desired accuracy levels are achieved one can utilize the trained neural network (800) as illustrated in FIG. 8. In one embodiment after trained neural network model is loaded (801) neural network inference is performed with input signal which is acquired from biometric scanner connected to a personal computer, microcomputer, embedded system or any other computing device in step (802). Said computing device should be capable of receiving digital biometric input signal, inferring the neural network features (803) given the input signal and decoding inferred features into biometric minutiae (804). The neural network training can be carried out on the same or a separate computing device. In one embodiment fingerprint images can be acquired in step (802) from sources which include scanned image, image loaded from a database, other data instances that can be fed with or without processing into the trained neural network as an input signal. In yet another embodiment the input signal may be preprocessed before inference at least for performance optimizations, prediction error reduction or due to data format restrictions.

In another embodiment trained neural network may be used in a dynamic setting (400), where neural network fine-tuning or re-training is performed as signals from initial dataset are updated, removed or new signals added. Firstly, acquired input data (401) is augmented (402) if necessary using similar means (502) as for training data. Later, neural network is fine-tuned on augmented data in step (403). Finally, the model of fine-tuned neural network is stored (404).

In yet another embodiment the system and method for signal feature extraction can be used for the purpose of classification, acquisition, person verification or identification of elements or segments of data signals using the neural network disclosed in current invention.

It is obvious to one skilled in art that due to the nature and current and foreseeable state of neural networks research, architecture disclosed herein apart from fingerprints can be applied to other biometric modalities like palmprints, footprints or even veins, irises and faces. In case of palmprint and footprint the friction ridge pattern structure is similar to fingerprint so the disclosed method can be applied without significant modifications, veins, irises and even more so faces have visual structure that differ significantly, but regardless of that vein pattern local feature points and face landmarks have at least locality in common which is a crucial property of disclosed method.

As can be understood, the present invention has been described in relation to particular embodiments, which are intended in all respects to be illustrative rather than restrictive. Alternative embodiments will become apparent to those of ordinary skill in the art to which the present invention pertains without departing from its scope. It will be also understood that certain features and subcombinations are of utility and may be employed without reference to other features and subcombinations.

REFERENCES CITED

U.S. Pat. No. 5,572,597—Fingerprint classification system
U.S. Pat. No. 5,825,907—Neural network system for classifying fingerprints
U.S. Pat. No. 5,892,838—Biometric recognition using a classification neural network
U.S. Pat. No. 7,082,394—Noise-robust feature extraction using multi-layer principal component analysis
US 2006/0215883 A1—Biometric identification apparatus and method using bio signals and artificial neural network
CN 107480649 A—Full convolutional neural network-based fingerprint sweat pore extraction method
Bhavesh Pandya, G. C. A. A. A. T. V. A. B. T. M. M., 2018. Fingerprint classification using a deep convolutional neural network. 2018 *4th International Conference on Information Management (ICIM)*, pp. 86-91.
Branka Stojanovid, A. N. O. M., 2015. Fingerprint ROI segmentation using fourier coefficients and neural networks. 2015 *23rd Telecommunications Forum Telfor (TELFOR).*, pp. 484-487.
Darlow, L. N. R. B., 2017. Fingerprint minutiae extraction using deep learning. 2017 *IEEE International Joint Conference on Biometrics (IJCB)*, pp. 22-30.
Dinh-Luan Nguyen, K. C. A. K. J., 2018. Robust Minutiae Extractor: Integrating Deep Networks and Fingerprint Domain Knowledge. 2018 *International Conference on Biometrics (ICB)*.
Hilbert, C.-F. C. E., 1994. *Fingerprint classification system*. United States of America, Patento Nr. 5,572,597.
Kai Cao, D.-L. N. C. T. A. K. J., 2018. End-to-End Latent Fingerprint Search.
Sankaran, A. a. P. P. a. V. M. a. S. R., 2014. On latent fingerprint minutiae extraction using stacked denoising sparse AutoEncoders. *IJCB 2014-2014 IEEE/IAPR International Joint Conference on Biometrics*, pp. 1-7.
Shrein, J. M., 2017. Fingerprint classification using convolutional neural networks and ridge orientation images. 2017 *IEEE Symposium Series on Computational Intelligence (SSCI)*, pp. 1-8.
Thomas Pinetz, D. S. R. H.-M. R. S., 2017. Using a U-Shaped Neural Network for minutiae extraction trained from refined, synthetic fingerprints. *Proceedings of the OAGM & ARW Joint Workshop* 2017, pp. 146-151.
Yao Tang, F. G. J. F., 2017. Latent fingerprint minutia extraction using fully convolutional network. 2017 *IEEE International Joint Conference on Biometrics (IJCB)*, pp. 117-123.
Yao Tang, F. G. J. F. Y. L., 2017. FingerNet: An unified deep network for fingerprint minutiae extraction. 2017 *IEEE International Joint Conference on Biometrics (IJCB)*, pp. 108-116.

The invention claimed is:

1. A neural network system implemented by one or more computers, said neural network system comprising:
a convolutional neural network, wherein the convolutional neural network is trained and configured to:
for each biometric input signal processed by the neural network system,
receive the biometric input signal at a first layer block of the convolutional neural network;
pass the biometric input signal through a plurality of layer blocks comprising an increasing number of channels and reduced spatial resolution of the output feature map with respect to the biometric input signal, wherein the plurality of layer blocks comprise layers and each layer comprises a nonlinear activation function; and
produce an output feature map by propagating the output of a last layer block into a plurality of convolutional branches;
wherein the neural network system further comprises a subsystem, wherein the subsystem is configured to:
receive the output feature map from the neural network;
decode the output feature map; and
output a decoded feature map representing friction ridge impression minutiae.

2. The system of claim 1, wherein decoding the output feature map comprises converting from the convolutional neural network output feature map to a friction ridge impression minutiae numeric representation, wherein minutiae numeric representation includes at least: class, rotation, and location.

3. The system of claim 2, wherein minutia class is one of: line ending, bifurcation, or none of the above.

4. The system of claim 1, wherein the convolutional neural network is a fully convolutional neural network.

5. The system of claim 1, wherein the biometric input signal is a digital friction ridge impression image.

6. The system of claim 1, wherein the output feature map comprises the output of the convolutional layer branches.

7. The system of claim 1, wherein the nonlinear activation function of a layer is a nonlinear pointwise activation function chosen from: Sigmoid, Hyperbolic Tangent, Concatenated ReLU, Leaky ReLU, Maxout, ReLU, ReLU-6, and Parametric ReLU.

8. The system of claim 1, wherein convolution is one of: regular convolution, depthwise separable convolution, or grouped convolution in combination with 1×1 convolutions or other type of convolution.

9. The system of claim 1, wherein the convolutional branches comprise a loss function, and wherein the loss function is a multi-loss function comprising multiple loss components.

10. The system of claim 9, wherein the multi-loss function components comprise at least: positive class loss, negative class loss, localization loss, and orientation loss.

11. The system of claim 10, wherein minutia positive class estimation is a classification problem.

12. The system of claim 10, wherein minutia negative class estimation is a classification problem.

13. The system of claim 10, minutia orientation estimation is a regression problem.

14. The system of claim 10, minutia localization estimation is a regression problem.

15. The system of claim 1, wherein the source for each biometric input signal is one of: biometric reader or loaded from memory.

16. The system of claim 1, wherein training the neural network process includes encoding friction ridge impression minutiae.

17. The system of claim 1, wherein training the neural network process includes generating an augmented biometric input signal.

18. The system of claim 1, wherein the output feature map is comprised of class, orientation, and location channels.

19. The system of claim 1, wherein each feature in the output feature map has a spatial resolution roughly equal to ⅛ of the biometric input signal resolution.

* * * * *